United States Patent
Bouguerra et al.

(10) Patent No.: US 11,082,441 B1
(45) Date of Patent: Aug. 3, 2021

(54) SYSTEMS AND METHODS FOR DETECTING DATA ANOMALIES BY ANALYSING MORPHOLOGIES OF KNOWN AND/OR UNKNOWN CYBERSECURITY THREATS

(71) Applicant: Flexxon Pte Ltd, Singapore (SG)

(72) Inventors: Nizar Bouguerra, Singapore (SG); Chan Mei Ling, Singapore (SG)

(73) Assignee: Flexxon Pte Ltd, Singapore (SG)

( * ) Notice: Subject to any disclaimer, the term of this patent is extended or adjusted under 35 U.S.C. 154(b) by 0 days.

(21) Appl. No.: 16/946,245

(22) Filed: Jun. 11, 2020

(30) Foreign Application Priority Data

Mar. 9, 2020 (SG) .................. 10202002125Q

(51) Int. Cl.
*H04L 29/06* (2006.01)
*H04L 9/32* (2006.01)
*G06N 20/00* (2019.01)
*G06F 16/901* (2019.01)

(52) U.S. Cl.
CPC ...... *H04L 63/1425* (2013.01); *G06F 16/9017* (2019.01); *G06N 20/00* (2019.01); *H04L 9/3247* (2013.01); *H04L 63/1416* (2013.01)

(58) Field of Classification Search
CPC ......... G06F 21/56–568; G06F 16/9017; H04L 63/1425; H04L 63/1416; H04L 9/3247; G06N 20/00
See application file for complete search history.

(56) References Cited

U.S. PATENT DOCUMENTS

| | | | |
|---|---|---|---|
| 10,491,627 B1* | 11/2019 | Su | ............... H04L 63/1416 |
| 2011/0010697 A1* | 1/2011 | Golovkin | ............... G06F 21/563 |
| | | | 717/155 |
| 2014/0090061 A1 | 3/2014 | Avasarala et al. | |
| 2014/0283037 A1* | 9/2014 | Sikorski | ............... G06F 21/563 |
| | | | 726/22 |
| 2017/0068816 A1* | 3/2017 | Cavazos | ............... G06F 21/562 |
| 2017/0262633 A1* | 9/2017 | Miserendino | ......... G06F 21/564 |
| 2019/0260804 A1 | 8/2019 | Beck et al. | |
| 2020/0042701 A1* | 2/2020 | Yang | ............... G06K 9/6264 |

OTHER PUBLICATIONS

Farley R. J., "Toward Automated Forensic Analysis of Obfuscated Malware", A dissertation submitted in oartial fulfilment of the requirements for the degree of Doctor of Philosophy at George Mason University, Dec. 31, 2015, pp. 1-138, Wake Forest University, Fairfax, VA, USA.

* cited by examiner

*Primary Examiner* — Thaddeus J Plecha
(74) *Attorney, Agent, or Firm* — Michael P. Eddy

(57) ABSTRACT

Systems and methods for detecting anomalous data files and preventing detected anomalous data files from being stored in a data storage. In particular, the systems and methods detect anomalous data files by dividing each data file into blocks of data whereby entropy values are obtained for each block of data and this information is collated and subsequently used in a machine learning model to ascertain the security level of the data file.

22 Claims, 8 Drawing Sheets

# SYSTEMS AND METHODS FOR DETECTING DATA ANOMALIES BY ANALYSING MORPHOLOGIES OF KNOWN AND/OR UNKNOWN CYBERSECURITY THREATS

CROSS-REFERENCES TO RELATED PATENT APPLICATIONS

The present application claims benefit of Singapore Patent Application No: 10202002125Q entitled "SYSTEM AND METHOD FOR DETECTING DATA ANOMALIES BY ANALYSING MORPHOLOGIES OF KNOWN AND/OR UNKNOWN CYBERSECURITY THREATS" and filed on 9 Mar. 2020, which is herein incorporated by reference in its entirety.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND

Embodiments of the inventive subject matter relate to systems, apparatuses and methods for detecting anomalous data files and preventing detected anomalous data files from being stored in a data storage. In particular, the system and method detect anomalous data files by dividing each data file into blocks of data whereby entropy values are obtained for each block of data and this information is collated and subsequently used in a machine learning model to ascertain the security level of the data file.

In today's digital age, computer systems are increasingly subjected to various forms and types of malicious cyber-attacks. The aim of these attacks are to illicitly gain access to a computer system and are typically carried out via malicious software (also known as "malware") installed in the computer system without the knowledge of the system's administrator. Malware may be installed in a computer system through a number of ways, from the system's network (e.g. email, or website), through a CD-ROM inserted into the system or through an external storage device connected to the system. Once the malware has gained access to the system, it can cause devastating damage by compromising the system's security (e.g. by creating backdoors), accessing sensitive information, deleting crucial files thereby causing the system to fail.

It is generally agreed that once malware has been installed, it becomes much harder to detect and this allows the computer system to be easily compromised by the attacker.

To address this issue, those skilled in the art have proposed that such malware or data be identified before it is allowed to infect a computer system. Once identified, the malware may then be classified so that the extent of damage that may be caused by the malware may be better understood and prevented should it occur again. Amongst the various techniques that have been proposed to identify malware include the temporal analysis and the live update approaches which are then used to update a database so that the database may be used to filter known malicious entities from affecting protected computer systems.

Initially, the most obvious way would be for the system administrator to manually analyse a suspicious program as the program is running. The administrator then observes the results to determine whether the program is to be treated as a malware or trusted software. During the administrator's analysis of the program, the administrator may decompile the program to investigate specific lines of code or pay special attention to application program interface (API) calls that interact with the computer system and/or external contacts to determine whether these calls indicate malicious behaviour. While such an approach may be through and detailed, it is extremely time consuming and inefficient. Hence, those skilled in the art have proposed alternative automated method.

In the temporal analysis approach, all activities in an affected system are sorted and reviewed according to time so that suspicious events occurring within a particular time period may be closely examined. Such events may include files accessed/installed/deleted/modified; logs of user entries; processes (including background processes) that were initiated or terminated; network ports that were remotely accessed, and etc. during the time period. Once the event that allowed the malware to be installed has been detected, the computer system's threat classification system may then be updated accordingly to prevent the reoccurrence of such an event.

An alternative to reviewing static historical data such as files and event logs is the live update method which examines live programs, system memory contents as the programs are running, current network port activity, and other types of metadata while the computer system is in use in order to identify how it may have been modified by an attacker. The information obtained from this method may then be used to update the system's threat classification system.

The updated threat classification system may then be used to review new files that are to be introduced to the system. This is done by comparing the characteristics of the new files with its database of known, previously encountered files. Such comparisons are typically done by cryptographically hashing the data that is to be compared, i.e. by applying a mathematical function to convert the data into compact numerical representations. It is then assumed that if the two hashes generated using the same algorithm are different, this implies that the new file may have been compromised.

The downside of the approaches proposed above is that they do not prevent zero-day type of malwares from affecting computer systems and are only useful in preventing reoccurrences of the same malware that have been previously detected. In other words, if slight modifications are made to these malware, there is the strong likelihood that the malware may slip through the system's defences and affect the computer system.

Other techniques that have been proposed to identify suspicious activity on a potentially compromised computer system often generate large amounts of data, all of which must be reviewed and interpreted before they may be used to update threat classification systems. As a further complication, the malware themselves are constantly evolving, developing new ways to circumvent existing detection methodologies, by employing various methods to camouflage their presence, making the job of computer security systems much more difficult. Some of these techniques include deleting indicators of their entry to a system such as the system's log file entries, file modification/access dates, and system processes. In addition to the above, the identity of the malware itself may be obfuscated by changing its name or execution profile such that it appears to be something benign thereby effectively camouflaging the malware.

However, when data is encrypted, compressed, or obfuscated (depending on the method of obfuscation) its entropy value, or its measure of randomness, tends to be higher than that of "organised" data. In other words, user generated documents and computer programs generally tend to be in a structured organized manner for ease of debugging while encrypted data tends to have a significant degree of entropy.

It is accepted that a measure of entropy isn't a guaranteed method for identifying malware or an attacker's hidden data store. A valid program may have encrypted, or more commonly, compressed, information stored on a computer system. However, at the very basic level, the examination of entropy does provide an excellent initial filter for identifying potentially problematic programs. By doing so, this greatly reduces the amount of data that needs to be analysed in great detail.

However, due to the way an entropy value is generated for a block of data, there is the possibility that a data block may return a low entropy value when in fact certain sections of that data block may contain small obfuscated blocks of malware. Such a scenario could occur when an attacker has placed encrypted malware in a data block with relatively low entropy thereby effectively masking the presence of the malware.

In view of the above, it is most desirous for a technique to derive a robust measurement of entropy in order to detect the presence of malware in a computer system while reducing the number of false positives generated during the detection process For the above reasons, those skilled in the art are constantly striving to come up with a system and method that is capable of generating a suitable entropy value for the data files whereby these entropic values and other information about the data file are provided to a supervised machine learning model to detect and identify anomalous data files before such files are stored in the computer system's storage device.

SUMMARY

The above and other problems are solved and an advance in the art is made by systems and methods provided by embodiments in accordance with the claimed subject matter encompassed by the term invention.

A first advantage of embodiments of systems and methods in accordance with the invention is that zero-day type anomalous files may be effectively and efficiently identified.

A second advantage of embodiments of systems and methods in accordance with the invention is that anomalous files that have yet to be labelled or identified as threats will be blocked and this information will be used to train the system's threat identifier to prevent evolutions of such similar malware.

A third advantage of embodiments of systems and methods in accordance with the invention is that regardless of the type of file introduced into the system, the file will be analysed to determine its threat value.

A fourth advantage of embodiments of systems and methods in accordance with the invention is that regardless of the type and/or size of the file introduced into the system (and which may not contain any data files), any Read/Write/Overwrite commands initiated by the file will be analysed as a front-end manager of a data flash controller will be configured to constantly sample commands executed by the file. The sampling period may vary between a few hundred of a millisecond to a few tens of seconds and by doing so, this prevents the system from ransomware attacks.

The above advantages are provided by embodiments of a method in accordance with the invention operating in the following manner.

According to a first aspect of the invention, a system for detecting data anomalies in a received data object is disclosed, the system comprising: a processing unit; and a non-transitory media readable by the processing unit, the media storing instructions that when executed by the processing unit, cause the processing unit to: determine a security posture of the data object based on a digital signature and a file type of the data object; generate a type-security-platform (TSP) lookup table based on the security posture and the features of the data object associated with the security posture, and generate an obfuscation value and a forensic value for the received data object based on the TSP lookup table; generate a disassembled value or an interpreted value for the data object; compute a result value for each block of the received data object, whereby the result value for each of the blocks is generated based on the disassembled or interpreted value, an obfuscation value and a forensic value associated with the block of the received data object; create a data model based on all the result values of the data object; and process the data model using an artificial intelligence (AI) algorithm to determine if the data object contains data anomalies.

With reference to the first aspect, the instructions to generate an obfuscation value for the received data object comprises instructions for directing the processing unit to: divide the data object into blocks of data; and calculate a Shannon Entropy value for each block of data.

With reference to the first aspect, the instructions to generate a forensic value for the received data object comprises instructions for directing the processing unit to: divide the data object into blocks of data; and calculate a similarity score for each block of data using a Frequency-Based Similarity hashing scheme.

With reference to the first aspect, the instructions to generate result values for each block of the received data object comprises instructions for directing the processing unit to: generate a result value comprising three bytes for each block of the received data, whereby for each block, the instructions direct the processing unit to: set a most significant bit (MSB) and a second MSB of a first byte of the result value based on the disassembled or interpreted value of the data object; parse a remainder of the bits of the first byte with a second byte of the result value, and set the parsed result based on the obfuscation value associated with the block; and set a value of a third byte based on the forensic value associated with the block.

With reference to the first aspect, the instructions to generate a data model based on all the result values of the data object comprises instructions for directing the processing unit to: generate a data image model whereby each pixel in the data image model is associated with a unique result value, wherein each unique result value is represented in the data image model by a unique image.

With reference to the first aspect, the AI algorithm used to process the data model comprises: a convolutional neural network (CNN) model, a deep neural network (DNN) model or a recurrent neural network (RNN) model.

With reference to the first aspect, the instructions to process the data model using the artificial intelligence (AI)

algorithm comprises instructions for directing the processing unit to: compare the data model with data models contained within a database, wherein the comparison is performed using machine learning algorithms.

With reference to the first aspect, the media further comprises instructions for directing the processing unit to: provide a virtual file system that is configured to receive and store the data object, whereby the virtual file system causes the processing unit to perform all the steps within the virtual file system.

With reference to the first aspect, the digital signature comprises a magic number associated with the data object.

With reference to the first aspect, the features of the data object associated with the security posture comprises a platform type and a file type of the data object.

According to a second aspect of the invention, a method for detecting data anomalies in a received data object using an Artificial Intelligence (AI) module is disclosed, the method comprising the steps of: determining, using an analyser module provided within the AI module, a security posture of the data object based on a digital signature and a file type of the data object; generating, using the analyser module and a detector module provided within the AI module, a type-security-platform (TSP) lookup table based on the security posture and the features of the data object associated with the security posture, and generate an obfuscation value and a forensic value for the received data object based on the TSP lookup table; generating, using a disassembling and interpreting module provided within the AI module, a disassembled value or an interpreted value for the data object; computing, using a block structuring module provided within the AI module, a result value for each block of the received data object, whereby the result value for each of the blocks is generated based on the disassembled or interpreted value, an obfuscation value and a forensic value associated with the block of the received data object; creating, using a model generator module provided within the AI module, a data model based on all the result values of the data object; and processing, using an AI threat module provided within the AI module, the data model using an artificial intelligence (AI) algorithm to determine if the data object contains data anomalies.

With reference to the second aspect, the step of generating the obfuscation value for the received data object comprises the steps of: dividing the data object into blocks of data; and calculating a Shannon Entropy value for each block of data.

With reference to the second aspect, the step of generating a forensic value for the received data object comprises the steps of: dividing the data object into blocks of data; and calculating a similarity score for each block of data using a Frequency-Based Similarity hashing scheme.

With reference to the second aspect, the step of generating result values for each block of the received data object comprises the steps of: generating a result value comprising three bytes for each block of the received data, whereby for each block, the method: sets a most significant bit (MSB) and a second MSB of a first byte of the result value based on the disassembled or interpreted value of the data object; parses a remainder of the bits of the first byte with a second byte of the result value, and set the parsed result based on the obfuscation value associated with the block; and sets a value of a third byte based on the forensic value associated with the block.

With reference to the second aspect, the step of creating a data model based on all the result values of the data object comprises the steps of: generating a data image model whereby each pixel in the data image model is associated with a unique result value, wherein each unique result value is represented in the data image model by a unique image.

With reference to the second aspect, the AI algorithm used to process the data model comprises: a convolutional neural network (CNN) model, a deep neural network (DNN) model or a recurrent neural network (RNN) model.

With reference to the second aspect, the step of processing the data model using the artificial intelligence (AI) algorithm comprises the step of: comparing the data model with data models contained within a database, wherein the comparison is performed using machine learning algorithms.

With reference to the second aspect, wherein before the step of determining the security posture of the data object based on the digital signature and the file type of the data object; the method further comprises the step of: providing, using the analyser module, a virtual file system to receive and store the data object, whereby the virtual file system causes all the steps of the method to be executed within the virtual file system.

With reference to the second aspect, the digital signature comprises a magic number associated with the data object.

With reference to the second aspect, the features of the data object associated with the security posture comprises a platform type and a file type of the data object.

BRIEF DESCRIPTION OF THE DRAWINGS

The above and other problems are solved by features and advantages of a system and method in accordance with the present invention described in the detailed description and shown in the following drawings.

DETAILED DESCRIPTION OF THE EMBODIMENTS

Figure 1:
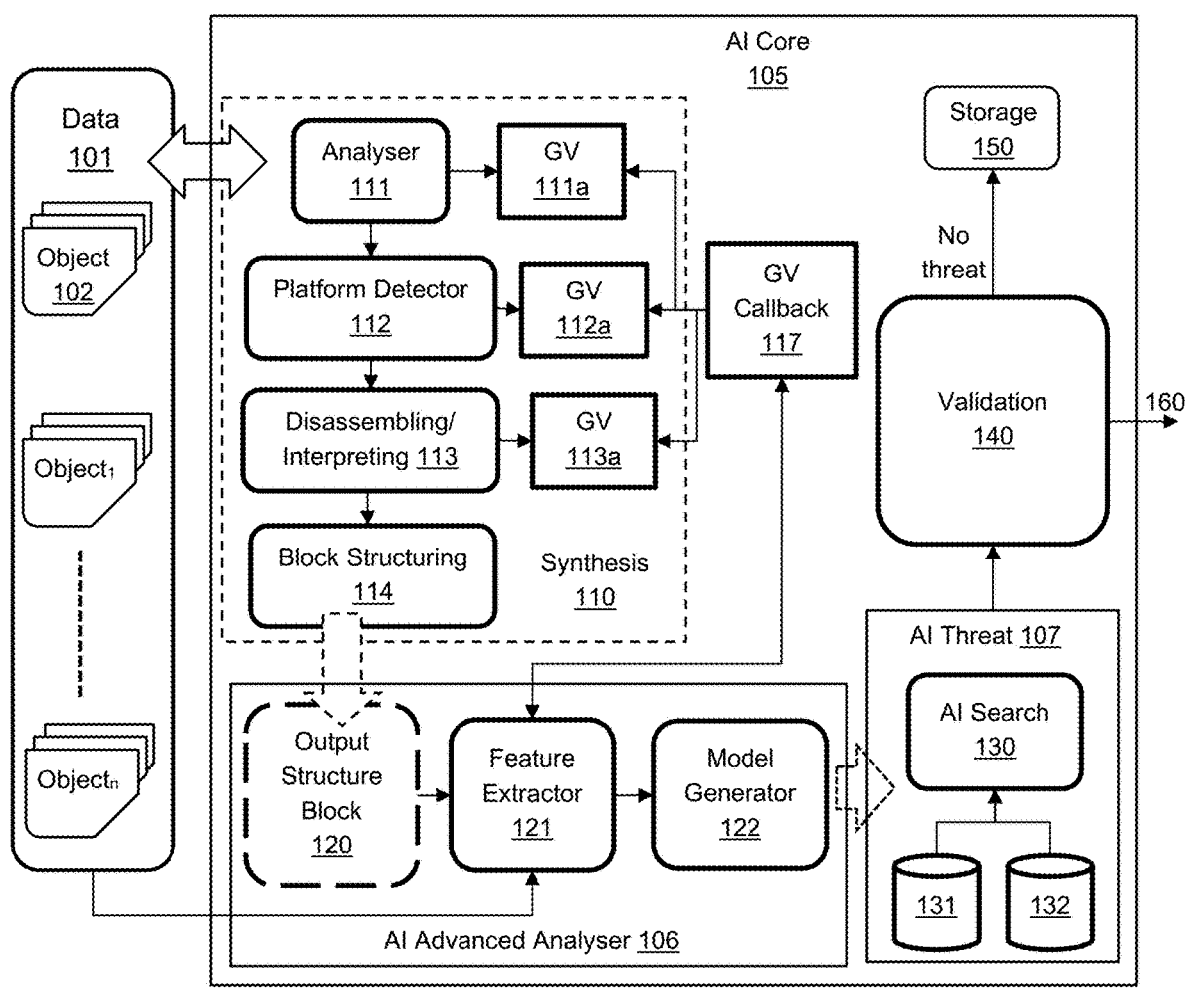
FIG. 1 illustrates a block diagram of modules that may be used to implement the method for detecting and analysing anomalies in accordance with embodiments of the claimed subject matter.

According to embodiments of the claimed subject matter, various apparatuses, systems and methods systems for detecting anomalous data files and preventing detected anomalous data files from being stored in a data storage.

In particular, the system and method divides each data file into blocks of data whereby entropy values are obtained for each block of data and this information is collated and subsequently used in a machine learning model to ascertain the security level of the data file. Files that are found to be anomalous are then quarantined while files that are deemed to be ok will be allowed to progress to the next step whereby it will be analysed for any malware and/or ransomware commands that may be running in the background (even if the file does not contain any data sections).

The embodiments of the claimed subject matter will now be described in detail as illustrated in the accompanying drawings. In the following description, numerous specific features are set forth in order to provide a thorough understanding of the embodiments of the present claimed subject matter, all of which encompasses the invention. It will be apparent, however, to one skilled in the art, that embodiments may be realised without some or all of the specific features. Such embodiments should also fall within the scope of the current invention. Further, certain process steps and/or structures in the following may not been described in detail and the reader will be referred to a corresponding citation so as to not obscurethe present invention unnecessarily.

Further, one skilled in the art will recognize that many functional units in this description have been labelled as modules throughout the specification. The person skilled in the art will also recognize that a module may be implemented as circuits, logic chips or any sort of discrete component. Still further, one skilled in the art will also recognize that a module may be implemented in software which may then be executed by a variety of processor architectures. In embodiments of the invention, a module may also comprise computer instructions or executable code that may instruct a computer processor to carry out a sequence of events based on instructions received. The choice of the implementation of the modules is left as a design choice to a person skilled in the art and does not limit the scope of this invention in any way.

An exemplary process or method for detecting, analysing and identifying an anomalous data file by an AI core processor in accordance with embodiments of the invention is set out in the steps below. The steps of the process or method are as follows:

Step 1: determine a security posture of the data object based on a digital signature and a file type of the data object;

Step 2: generate a type-security-platform (TSP) lookup table based on the security posture and the features of the data object associated with the security posture, and generate an obfuscation value and a forensic value for the received data object;

Step 3: generate a disassembled value or an interpreted value for the data object;

Step 4: compute a result value for each block of the received data object, whereby the result value for each of the blocks is generated based on the disassembled or interpreted value, an obfuscation value and a forensic value associated with the block of the received data object;

Step 5: create a data model based on all the result values of the data object; and Step 6: process the data model using an artificial intelligence (AI) algorithm to determine if the data object contains data anomalies.

In accordance with embodiments of the invention, the steps set out above may be performed by modules contained within artificial intelligence (AI) core module 105, as illustrated in FIG. 1, whereby AI core module 105 comprises synthesis module 110, AI advanced analyser module 106, AI threat module 107, validation module 140 and storage 150.

In turn, synthesis module 110 comprises sub-modules: analyser 111; platform detector 112; disassembling/interpreting 113; and block structuring 114 while AI advanced analyser module 106 comprises sub-modules: output structure block 120; feature extractor 121; and model generator 122. As for AI threat module 107, this module comprises sub-modules AI search 130; database 131; and trained database 132.

In embodiments of the invention, data 101 may comprise all types and formats of data objects and the content of these data may include, but are not limited to, video files, documents, images, spreadsheets, application programming interfaces, executable files and all other types of files with various file extensions/or dummy command bytes such as Read/Write(erase) commands. In general, data 101 may be divided into a plurality of sub-objects 102, which when combined, make up data 101 as a whole. In embodiments of the invention, data 101 are categorized into smaller sub-objects 102 so that it would be easier for AI core module 105 to process each of these smaller sub-objects efficiently and effectively.

Data 101 or objects 102 (sub-divided data 101) are then received by synthesis module 110. From herein, although reference is made to data 101, one skilled in the art will recognize that the subsequently discussed steps and processes may be applied also to all sorts of data objects and even sub-objects 102 without departing from the invention. Upon receiving data 101, analyser module 111 analyses the data structure of data 101 to obtain more details and information about the structure and make-up of data 101. In an embodiment of the invention, analyser module 111 is configured to determine through a digital signature lookup table, a file lookup table or a magic number lookup table whether data 101 is an anomalous file. In embodiments of the invention, analyser module 111 creates an optional virtual file system that is configured to read the file in a sandbox environment. Analyser module 111 then generates an appropriate security flag for data 101 which is then used in the generation of a unique type-security-platform (TSP) lookup table associated with data 101. This TSP lookup table is then used by the other modules in synthesis module 110 to analyse data 101 in greater detail.

Platform detector module 112 is then configured to populate the remainder of the received TSP lookup table based on certain key features about data 101 such as, but not limited to, its file type, its operating platform and computer architectures that may be affected and/or altered by data 101 and its security posture. The result of the analysis performed by detector module 112 is then stored at GV module 112a and is also provided to disassembling/interpreting module 113.

At disassembling/interpreting module 113, the result generated by detector module 112 is then either disassembled to generate a disassembled dataset or value, or is sent to a de-scripting source to be interpreted for recognizable ASCII terms and the interpreted data object and its corresponding value is then returned back to module 113 to be further processed. The dataset model is then stored at GV module 113a and provided to the next module, the block structuring module 114.

At block structuring module 114, obfuscated data and/or other relevant features may be extracted from the reduced dataset. In embodiments of the invention, structuring module 114 identifies functions, external call functions, objects that communicate with input/output ports in turn adds this information to the dataset model. This dataset model may be presented as a complex table of bytes, i.e. output structure block 120, to AI advanced analyser module 106. In embodiments of the invention, the dataset model will be generated by block structuring module 114 based on the outputs of modules 111, 112 and 113. Module 114 will parse all the results obtained from the entropy/forensic/dissembler processes into a dataset model which possesses an appropriate data structure to unify all the results together. In embodiments of the invention, parsed results contained within this structure will be named with a prefix, whereby the prefix will be used to indicate the result's data or the function's name, e.g. the result of a forensic table will be named as "Prefix.Forensic.typeofForensic.table.result1.result2.result3".

Once this information is provided to module 106, feature extractor module 121 will collate information contained within the output structure block 120 together with the outputs stored at GV modules 111a, 112a and 113a through GV call-back module 117, and data 101 and provide this collated information to model generator module 122.

Model generator module 122 then in turn uses the received information to generate an appropriate model. The model is then provided to and stored in database 131 and is used in combination with trained database 132 by AI search module 130 to determine a threat score for the model.

In embodiments of the invention, features obtained from extractor module 121 may be used by the model generator module 122 to generate a data image model having a matrix comprising 512×512 pixels, whereby each pixel represents a block of data 101 and is made up of 3 bytes of data. The generated data image model and/or the dataset model will then be temporarily stored inside database 131. AI search module 130 will then run a matching algorithm to match the model stored within database 131 with datasets stored in trained database 132. The outcome will then be normalized by 100 and the normalized score will then be passed to validation module 140. Within this module, various scoring settings may be defined by the user of the system, such as, but not limited to:

scores between 0 and 50 may imply that there is "no threat";
scores between 51 and 85 may imply that the file type is "benign"; and
scores between 86 to 99 may imply that there is a "threat".

In embodiments of the invention, AI search module 130 utilizes a supervised machine learning algorithm to assign the threat scores to the dataset model. In embodiments of the invention, the supervised machine learning techniques such as, but not limited to, linear regression, random forest and/or support vector machines may be used.

Once the threat scores have been assigned, these scores are then provided with data 101 to validation module 140. If validation model 140 ascertains based on the scores that data 101 is a threat, data 101 will be blocked from being installed in storage 150 and instead, will be provided to an output 160 whereby data 101 will either be quarantined or further analysed.

Conversely, if it is decided that data 101 does not constitute a threat, it will be allowed to be installed in storage 150. For completeness, storage 150 may comprise, but is not limited to, any type or form of data storage such as a computer system's primary storage (e.g. RAM, solid state and/or magnetic hard disk) or the system's secondary storage (e.g. removable drives).

Figure 2:
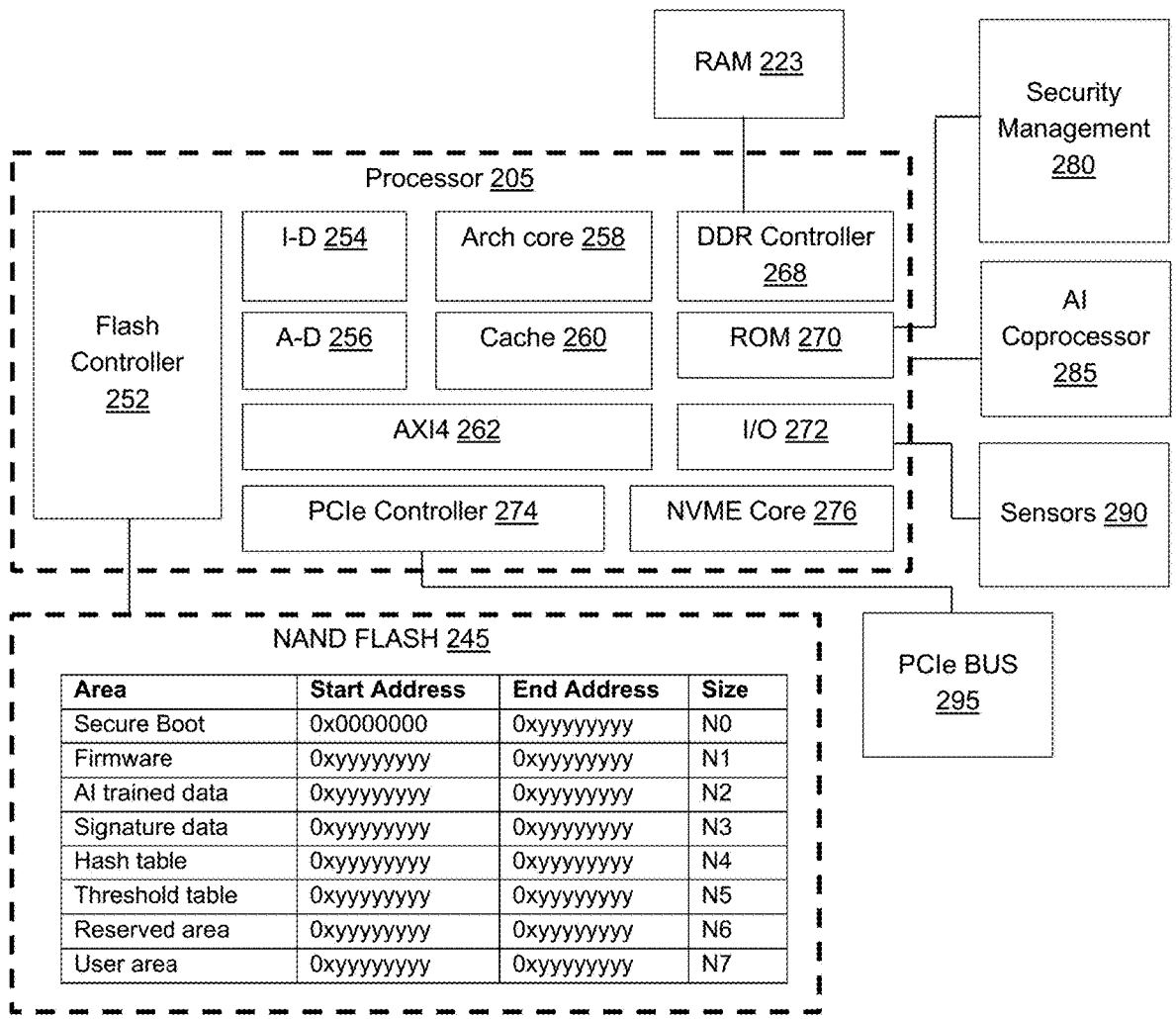
FIG. 2 illustrates a block diagram representative of processing systems providing embodiments in accordance with embodiments of the claimed subject matter.

In accordance with embodiments of the invention, a block diagram representative of components that may be provided within AI core 105 (as illustrated in FIG. 1) for implementing embodiments in accordance with embodiments of the invention is illustrated in FIG. 2. One skilled in the art will recognize that the exact configuration of AI core 105 is not fixed and may be different and may vary and FIG. 2 is provided by way of example only.

Herein the term "processor" is used to refer generically to any device or component that can process such instructions and may include: a microprocessor, microcontroller, programmable logic device or other computational device. That is, processor 205 may be provided by any suitable logic circuitry for receiving inputs, processing them in accordance with instructions stored in memory and generating outputs (i.e. to the memory components, security management module 280, AI coprocessor 285, sensors 290 and/or PCIe BUS, etc.). In this embodiment, processor 205 may be a single core or multi-core processor with memory addressable space. In one example, processor 205 may be multi-core, comprising—for example—an 8 core CPU.

In embodiments of the invention, processor 205 may comprise flash controller 252 that is configured to control any type of non-volatile memory storage medium that may be electrically erased and programmed. An example of such a non-volatile memory storage would be NAND or NOR type flash memory or non-flash EEPROM flash memory. In FIG. 2, although flash controller 252 is arranged to control NAND flash 245 which stores the secure boot, firmware, AI trained data, signature data, hash table, threshold table, reserved area and user area, one skilled in the art will recognize that other types of data and information may be stored in NAND flash 245 without departing from the invention.

Processor 205 also comprises DDR controller 268 that is configured to control any type of volatile random access memory RAM 223 such as static random access memory (SRAM) or dynamic-random access memory (DRAM). A read only memory (ROM) module ROM 270 is also provided within processor 205 together with I-D 254, A-D 256, architecture core 258, AXI4 262, and NVME core 276. In particular, I-D 254 comprises an instruction decoder configured to decode instructions for processor 205, A-D 256 comprises an address decoder configured to decode addresses for each physical peripheral used within the chipset such that all address buses are managed within processor 205, and architecture core 258 comprises the architecture core of processor 205 such as, but not limited to, an ARM architecture, a MIPS architecture, a RISC-VARCH architecture and so on whereby the architecture type depends on the number of instructions that processor 205 is handling, the amount of power consumed and etc.

As for AXI4 262, this component comprises an interconnect bus connection identified as AXI4. AXI4 262 is a connection that is frequently used by many ASIC manufacturers and it broadly comprises a SLAVE/MASTER bus and a high speed internal communication bus connecting processor 205 with other components contained within whereby each component linked to this interconnection bus will have its own address.

Non-volatile Memory Express (NVME) core 276 comprises a component that is configured to handle all READ/WRITE and admin operation commands from the user's host and this is done through a direct connection to PCIe bus 295 through AXI4 262. This means that each time a data object is received from a host or is sent to the host, this transmission will be controlled by NVME core 276. It should be noted that this component may be configured to operate independently from processor 205 and may be used to monitor all NVME commands executed within a predefined time frame. Additionally, NVME core 276 may be configured to sync the speed of the data rate between DDR controller 268 and flash controller 252, whereby such an operation is known as Flash Transition Layer.

Cache 260 is also provided within processor 205 and is used by the processor to reduce the average cost (time or energy) to access data from the various types of memories.

One skilled in the art will recognize that the various memory components described above comprise non-transitory computer-readable media and shall be taken to comprise all computer-readable media except for a transitory, propagating signal. Typically, the instructions are stored as program code in the memory components but can also be hardwired.

Peripheral Component Interconnect Express (officially abbreviated as PCIe) controller 274 is a controller for controlling data exchanges that take place on the high-speed serial computer expansion bus between processor 205 and various host computers that are able to support PCIe bus protocol. Input/output (I/O) interface 272 is also provided for communicating with various types of user interfaces, communications interfaces and sensors 290. Sensors 290 may include, but are not limited to, motion sensors, temperature sensors, impact sensors and these sensors may be configured to transmit/receive data to/from external sources via a wired or wireless network to other processing devices or to receive data via the wired or wireless network. Wireless networks that may be utilized include, but are not limited to, Wireless-Fidelity (Wi-Fi), Bluetooth, Near Field Communication (NFC), cellular networks, satellite networks, telecommunication networks, Wide Area Networks (WAN) and the like. AI coprocessor 285 is connected to processor 205 via a dedicated bus (not shown) and comprises a specialized hardware accelerator that is designed to accelerate artificial intelligence applications, especially machine learning algorithms and is used to accelerate specific computing tasks to lighten the load on processor 205.

Figure 3:
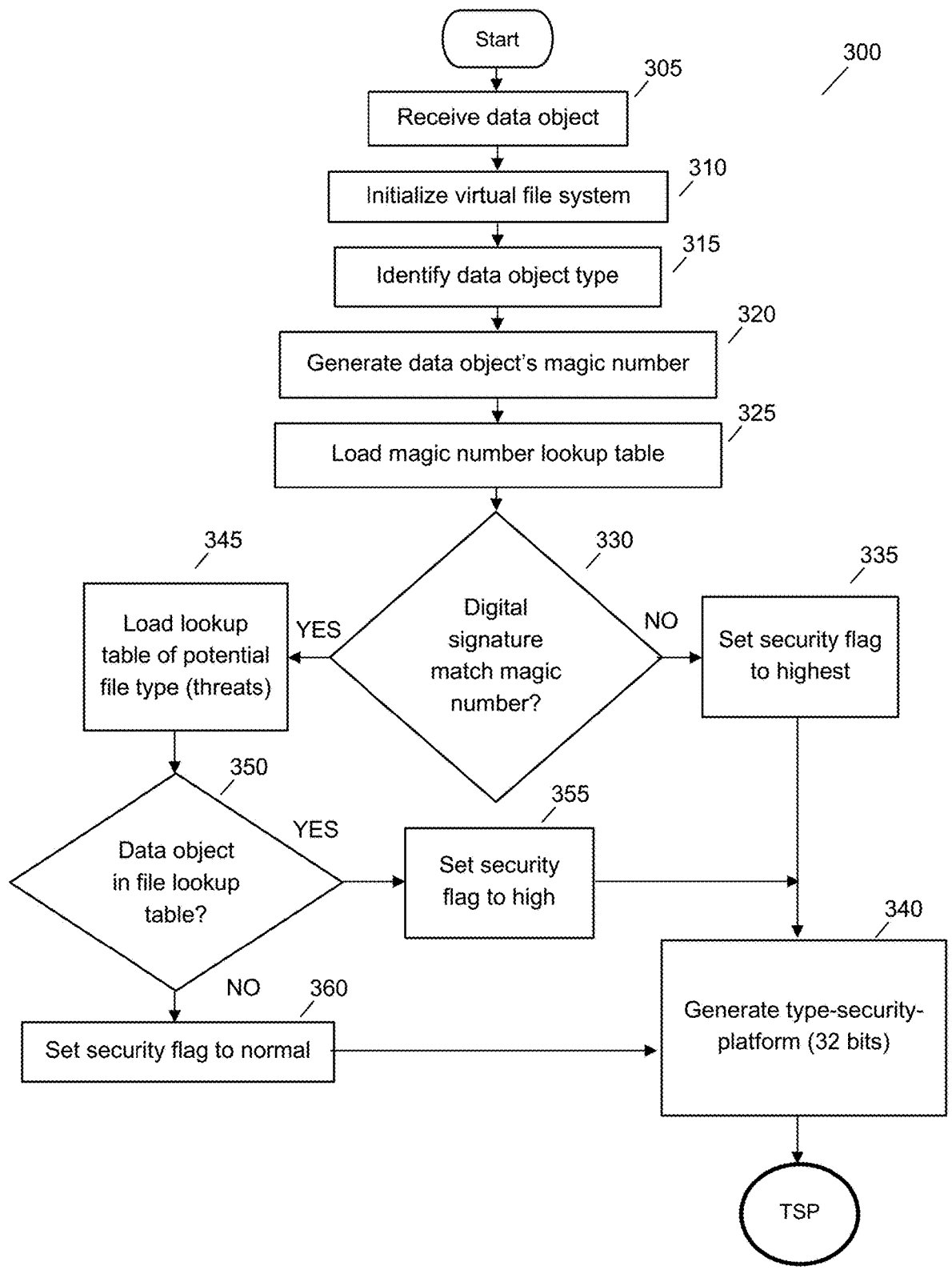
FIG. 3 illustrates a process or method for detecting anomalous data files in accordance with embodiments of the claimed subject matter.

FIG. 3 illustrates process 300 for analysing a received data object, whereby process 300 may be implemented by the modules in the AI core in accordance with embodiments of the invention. Process 300 begins at step 305 by receiving a data object that is to be analysed. As mentioned in the previous section, the data object may comprise a document, image file, an executable file or any other types of files. In embodiments of the invention, the data object may comprise blocks of bytes whereby these blocks of bytes will be stored in a storage medium linked to the AI core, such as, but not limited to, a flash drive chipset where it will be assigned an area to record its size, flash location sectors and Start-of-File and End-of-File.

Process 300 then proceeds to step 310 whereby optionally, a virtual file system is initialized once the entirety of the data object has been completely received. At this step, a virtual file system that is able to read the data object in the same manner as a host drive is created by process 300. However, unlike conventional drives or file systems, the virtual file system has no direct link to drives accessible by the host drive as the virtual file system is configured to be completely separate. Further, as the virtual file system is configured to run inside an ASIC chipset, it requires lesser hardware resources and is able to be executed in parallel with other tasks. Hence, as new objects are received at step 305, process 300 will add these new data objects into an internal list in the virtual file system to be queued for further processing. In embodiments of the invention, process 300 will continuously monitor this internal list, to ensure that the data object will not be called back until it has been analysed and secured. In order to do this, the internal list may be contained in a temporary buffer that may be isolated from the host file system and may be temporarily locked. In other words, in one embodiment of the invention, it can be said that the entirety of processes 300 and 400 take place within the virtual file system while in another embodiment of the invention, processes 300 and 400 may take place outside the virtual file system. This means that if processes 300 and 400 take place outside the virtual file system, process 300 will proceed from step 305 to step 315.

At step 315, either from within the virtual file system or within the AI core, process 300 then checks the data object's type. In embodiments of the invention, this may be done by checking its name. For example, if the data object is named "xxyyy.pdf", process 300 then stores this information in a temporary variable which may be called extension[n−1]= pdf.

Information from step 315 is then passed to step 320. At this step, process 300 generates a magic number or a special header frame that is unique to the data object and this magic number may then be embedded inside the data object whereby it may then be used by the host system to identify the data object's type.

Process 300 then loads a preloaded magic number lookup table at step 325. As known to one skilled in the art, magic numbers refers to constant numerical values that may be used to identify a particular file format or protocol or may also refer to distinctive unique values that are unlikely to be mistaken for other meanings. Each magic number in the preloaded magic number lookup table refers to a particular file format or type and this lookup table may be updated periodically as required, or whenever a new file type is discovered.

Process 300 then determines at step 330 if the generated magic number matches with any of the magic numbers in the preloaded magic number lookup table.

If process 300 determines that a match does not exist, process 300 proceeds to step 335. At this step, a security flag associated with a soon to be generated type-security-platform (TSP) lookup table will be generated and set to a high level. Process 300 then proceeds to step 340 whereby a type-security-platform (TSP) lookup table is generated.

Conversely, if process 300 determines at step 330 that the generated magic number matches with a magic number in the preloaded magic number lookup table this would imply that the data object comprises a known file type.

Process 300 then loads a lookup table of potential anomalous file types (e.g. stored as a data array) at step 345 whereby each known anomalous file type in this table is associated with a magic number. In this embodiment of the invention, an anomalous file type represents a file that is a potential threat and may be executed on different platforms without having to be compiled with a specific tool chain compiler (for example a Java script object, a pdf file, a jpeg (with embedded exe file and called later to extract it).

Process 300 then determines at step 350 whether the file type of the received data object matches with an anomalous file type in the lookup table of potential anomalous file types loaded at step 345.

If process 300 determines that there is a match, process 300 proceeds to step 355. At this step, a security flag associated with a soon to be generated type-security-platform (TSP) lookup table will be generated and the flag will be set to a high level. Process 300 then proceeds to step 340 whereby a TSP lookup table is then generated.

Conversely, if process 300 determines at step 350 that the file type of the received data object is not a match with an anomalous file type, process 300 proceeds to step 360 whereby a security flag associated with a soon to be generated type-security-platform (TSP) lookup table will be generated and set to a normal level indicating that the data object may not be an anomalous file. Process 300 then proceeds to step 340 whereby a TSP lookup table is then generated.

In accordance with embodiments of the invention, a TSP lookup comprises a 32-bit variable whereby the first 16 most significant bits (MSB) represent the various types of data objects (i.e. bits 31(MSB) to 16), the subsequent 8 bits represent the security posture of the data object (i.e. bits 15 to 8) and the final 8 bits represent the platform usage of the data object (i.e. bits 7 to 0—the least significant bit (LSB)). An exemplary TSP lookup table is set out below at Tables 1-3:

Table 1:

TABLE 1

| Type | \multicolumn{16}{c}{Bits} |
|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 |
| *.pdf | 1 | 1 | 0 | 0 | 0 | 0 | 0 | 0 | 0 | 0 | 0 | 0 | 0 | 0 | 0 | 0 |
| *.jpeg | 1 | 0 | 0 | 0 | 0 | 0 | 0 | 0 | 0 | 0 | 0 | 0 | 0 | 0 | 0 | 1 |
| *.bmp | 0 | 0 | 0 | 0 | 0 | 0 | 0 | 0 | 0 | 0 | 0 | 0 | 1 | 0 | 0 | 0 |
| *.exe | 1 | 0 | 0 | 0 | 0 | 0 | 1 | 0 | 0 | 0 | 0 | 0 | 0 | 0 | 0 | 0 |
| . | . | . | . | . | . | . | . | . | . | . | . | . | . | . | . | . |
| . | . | . | . | . | . | . | . | . | . | . | . | . | . | . | . | . |
| . | . | . | . | . | . | . | . | . | . | . | . | . | . | . | . | . |
| *any | 0 | 0 | 0 | 1 | 0 | 0 | 0 | 0 | 0 | 0 | 0 | 0 | 0 | 0 | 0 | 0 |

Table 2:

TABLE 2

| Security | \multicolumn{8}{c}{Bits} |
|---|---|---|---|---|---|---|---|---|
| | 15 | 14 | 13 | 12 | 11 | 10 | 9 | 8 |
| Status_1 | 1 | 1 | 0 | 0 | 0 | 0 | 0 | 1 |
| Status_2 | 1 | 0 | 0 | 0 | 1 | 0 | 0 | 0 |
| Status_3 | 0 | 0 | 1 | 0 | 0 | 0 | 0 | 0 |
| Status_4 | 0 | 0 | 0 | 1 | 0 | 0 | 0 | 1 |
| . | . | . | . | . | . | . | . | . |
| . | . | . | . | . | . | . | . | . |
| . | . | . | . | . | . | . | . | . |
| Status_n | 0 | 1 | 0 | 1 | 0 | 0 | 1 | 0 |

Table 3:

TABLE 3

| Platform | \multicolumn{8}{c}{Bits} |
|---|---|---|---|---|---|---|---|---|
| | 7 | 6 | 5 | 4 | 3 | 2 | 1 | 0 (LSB) |
| X86 | 1 | 1 | 0 | 0 | 0 | 1 | 0 | B |
| X64 | 1 | 0 | 0 | 1 | 0 | 0 | 0 | B |
| AMD | 1 | 1 | 0 | 0 | 0 | 0 | 0 | B |
| ARM | 1 | 0 | 1 | 0 | 1 | 0 | 0 | B |
| . | . | . | . | . | . | . | . | . |
| . | . | . | . | . | . | . | . | . |
| Etc. | 1 | 0 | 0 | 1 | 0 | 1 | 1 | B |

Table 1 sets out an example how the various file types may be represented by bits 31 (MSB) to 16 in the TSP lookup table, Table 2 sets an example how the security posture of a data object may be represented by bits 15 to 8 and Table 3 sets an example how the various types of platforms used by the data object may be represented by bits 7 to 0.

In an embodiment of the invention, with reference to Table 2, "Status_1" may indicate that a data object's security flag has been set to the highest level and that its digital signature did not match with any magic number in the magic number lookup table, "Status_2" may indicate that a data object's security flag has been set to the highest level and that its digital signature matched with a magic number in the magic number lookup table but the file type of the data object matches with an anomalous file type in the file lookup table and "Status_3" may indicate that a data object's security flag has been set to a normal level, its digital signature matched with a magic number in the magic number lookup table and its file type does not match with any known anomalous file type. One skilled in the art will recognize that various types of Status levels may be used to represent other types and variations of security postures without departing from this invention.

In embodiments of the invention, with reference to Table 3, bits 7 to 4 may be used to represent the file's architecture, the file's microcontroller unit (MCU) execution, operating system/hardware platform, and the lowest 4 bits (bits 3-0) may indicate the possible operating system of the data object, whereby if the LSB is set as B (or any other equivalent indicator) it means that the data object may run on any type of operating system.

Figure 4:
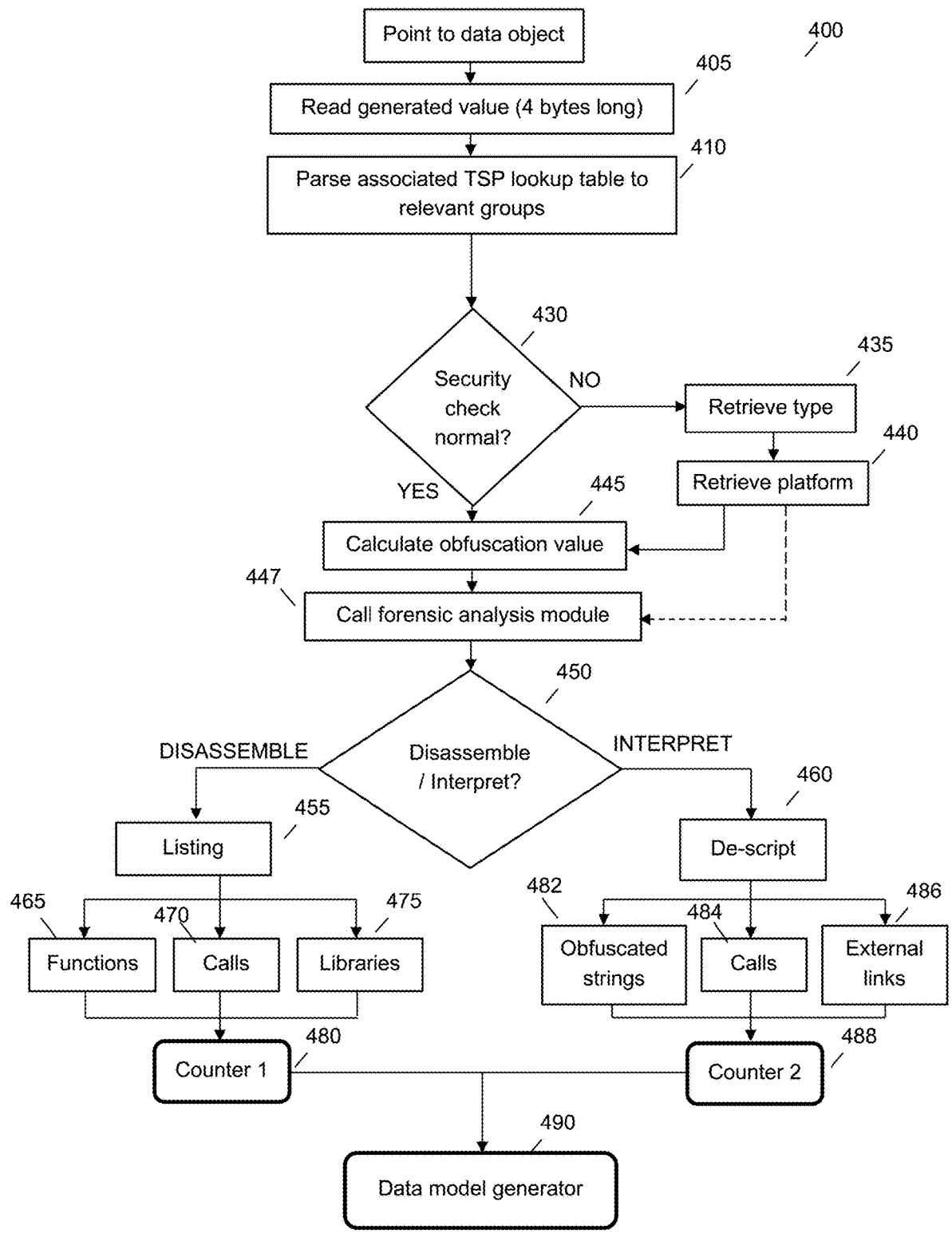
FIG. 4 illustrates a process or method for utilizing a 32-bit security lookup table to generate a data model in accordance with embodiments of the claimed subject matter.

Once the TSP lookup table has been generated for a data object, process 400 as illustrated in FIG. 4 is then initiated. Process 400 begins by retrieving the location of the data object as stored within the virtual file system (if process 400 is taking place within the virtual file system) or as stored in the AI core. Process 400 then retrieves the TSP lookup table associated with the data object at the next step, step 405. Process 400, at step 410, then parses the information contained in the TSP lookup table to their relevant groups. In particular, the bits in the TSP lookup table relating to the security status of the data object will be parsed a first group, bits in the TSP lookup table relating to the type of the data object will be parsed to a second group and bits in the TSP lookup table relating to the target platform of the data object will be parsed to a third group.

Process 400 then proceeds to step 430, where process 400 will determine from the first group of parsed bits whether the security level has been set to a normal or high level.

If process 400 determines that the security level has been set to a high level, it will proceed to step 435 whereby it will retrieve information relating to the type of the data object from the TSP and then to step 440 whereby it will retrieve information relating to the operating platform associated with the data object from the TSP. This information would be contained in the second and third group of parsed bits in the TSP. Information from steps 435 and 440 are then provided to step 447 and process 400 proceeds to step 445. The aim of providing information from 435 and 440 to step 447 is so that the forensic analysis may then be performed based on information from these two steps.

At step 445, process 400 proceeds to calculate an obfuscation value for the whole data object, i.e. for the whole file size, based on the information received. Conversely, if process 400 determines that the security level has been set to a normal level, process 400 proceeds directly to step 445 to calculate an obfuscation value for the data object as a whole.

As an example, the range of the obfuscation values may be between 0-255 whereby a higher obfuscation value implies a higher risk of malware or ransomware.

In embodiments of the invention, the obfuscation values of the data object comprises the entropy values for the data object. In this embodiment, process 400 will proceed to compute an entropy value for the data object by first normalizing the size of the data object. For example, if the data object comprises 1 Mbyte of data, it will be divided by 256 to produce 43 000 blocks whereby each block comprises 256 bytes. The Shannon Entropy value for each block is then obtained as follows. There are several mathematical methods for generating a numerical value for the entropy of data, or the representation of the "randomness" of a block of data. In an embodiment of the invention, the entropy value is calculated using a method pioneered by Claude Shannon and is known by those skilled in the art as the Shannon Entropy equation:

$$H(X) = \sum_{i=1}^{n} p(x_i) \log_2 \left( \frac{1}{p(x_i)} \right)$$

where p(x) is the probability of x given the discrete random variable X. Since X is discrete, data represented by binary digital data organized in bytes (or 8-bit blocks) may be used in place of X. In order for the equation to work properly, X must comprise a minimum block of data which is at least 256 bytes in length. The value obtained is then normalized such that $PH(X) \in 0.0 \ldots 1.0$ where $PH(X) = H(X)|MAX(H(X))$ In short, the entropy value calculated based on the equations above will comprise a numerical value between 0 and 1, where values closer to 1 indicate higher degrees of entropy in a given block of data. For a more thorough discussion of Shannon Entropy, reference is made to the publication titled Shannon, C. E. "A Mathematical Theory of Communication" *The Bell System Technical J* 27, 379-423 and 623-656, July and October 1948, which is incorporated herein by reference. One skilled in the art will recognize that any other types of entropy calculation methods could be used without departing from scope of the claimed subject matter.

The entropy values obtained for each of the blocks may then be set out as illustrated in exemplary Table 4 below.

TABLE 4

| Entropy value | | | | | | | | | |
|---|---|---|---|---|---|---|---|---|---|
| 1.0 | X | | | X | X | | | | X |
| 0.9 | | X | X | | | | | | |
| 0.8 | | | | | | X | X | | |
| 0.7 | | | | | | | | | |
| 0.0 | | | | | | | | | |
| Block no. | Block$_0$ | Block$_1$ | Block$_2$ | Block$_3$ | Block$_4$ | Block$_5$ | Block$_6$ | ... | Block$_n$ |

Figure 5:
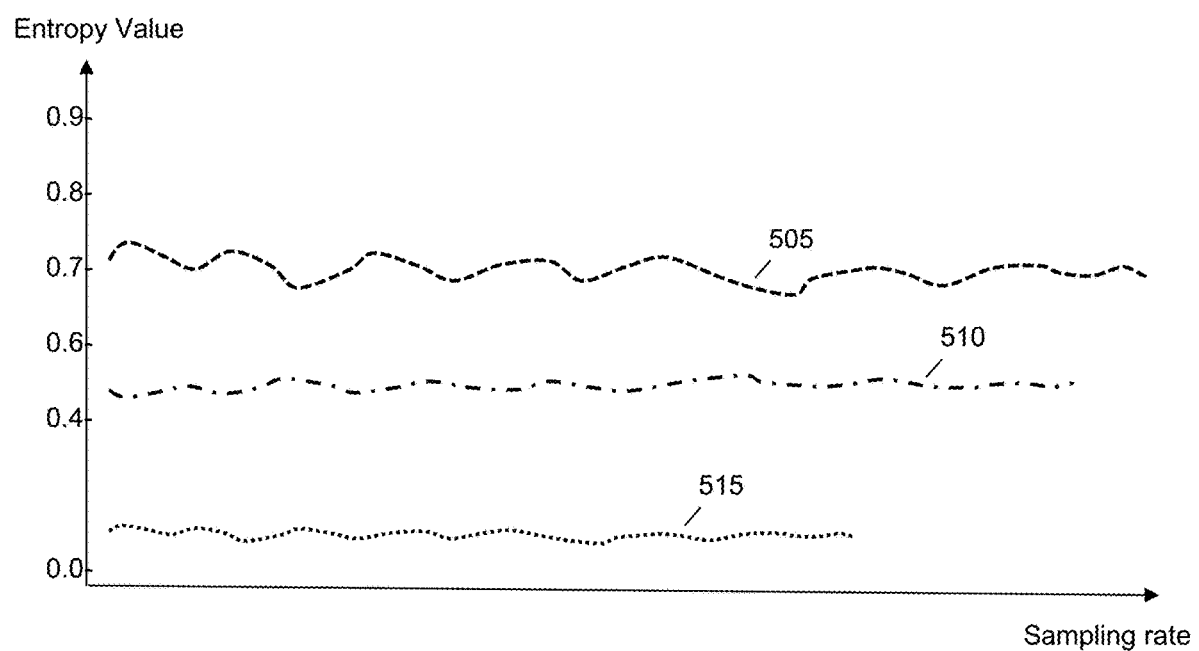
FIG. 5 illustrates a diagram showing the entropy values being plotted against the sampling rate obtained for an exemplary data object in accordance with embodiments of the claimed subject matter.

Table 4 shows an exemplary plot for a malware data object. As can be seen, most of the blocks exhibit high entropy values hence indicating that this data object is highly likely an anomalous data object. The results obtained from the entropy computations may also be plotted as illustrated in FIG. 5 whereby plots 505 and 510 represent entropy lines that may be associated with anomalous data objects, e.g. malware, while plot 515 which has lower entropy values may represent a non-anomalous data object. In embodiments of the invention, these patterns or plots may be used as digital fingerprints of the data object. This result will then be passed to the next module whereby it will be utilized to select the most suitable predefined forensic algorithm that is to be applied by process 400.

Process 400 then proceeds to step 447 whereby process 400 calls a forensic analysis function to determine if the data object's digital fingerprints, i.e. computed forensic analysis values and/or the entropy patterns (e.g. Table 4) show that there is the possibility that the data object may contain malware.

If it was previously determined at step 430 that the security level of the data object has been set to a normal level, the forensic analysis will be performed based on solely the blocks of the data object. However, if it was previously determined at step 430 that the security level of the data object was set to a high level, the forensic analysis will be performed based on the blocks of the data object together with the type and platform information retrieved at step 435 and 440 for each of the blocks.

The forensic module will generate forensic values that represent both the investigation method adopted and a similarity output that is between 1 to 10, whereby a lower value represents a lower risk (lesser match) and a higher value represents a higher risk (higher match). One skilled in the art will recognize that existing forensic analysis functions may be used without departing from this invention. By way of an example, exemplary (but not limiting) pseudo-code set out below may be used for the forensic analysis.

Pseudocode for Forensic Analysis
Forensic_t[0][Entropy method][result]
Forensic_t[1][fbhash_method][result]
Forensic_t[n−1][until the available method][result]
Enum {METHOD1 METHOD2 METHOD3 METHODn−1} LIST;
Typedef ARRAY[x][y][z] Forensic
Declare pointer pDATA=Data Object;
Declare variable Result[ ];
I=array{LIST}.
For x=0 TO X<COUNT(LIST)
FUNCTION_FORENSIC(pDATA,X,LIST{X},Result[X]) (the objective of this function is to perform a call back to an enumerated method in a list whereby the result will be matched to the method used)
Forensic[x],[LIST{X}],[RESULT[X]]; (this buffer value will be used to track the method used, the method's name and its own result which is to be used later for the feature extract function)
X=X+1;
FUNCTION_FORENSIC(pDATA,X,LIST{X},Result[X])
Declare local=sizeof(pDATA);
Declare LResult=0;
Switch (LIST{X}) Case METHOD1:
Analyse_M1(local,pDATA); (each function will be called based in statement case)
Result[X]=LResult
Case METHOD2:
Analyse_M2(local,pDATA);
Result[X]=LResult
Case METHODn−1:
Analyse_Mn−1(local,pDATA);
Result[X]=LResult In embodiments of the invention, other types of forensic analysis may be carried out and this may comprise the step of hashing the data object using hashing methods known in digital forensics, such as, but not limited to the Frequency-Based Similarity hashing scheme (FbHash).

One skilled in the art will recognize that other types of investigative methods could be used without departing from this invention and the choice is left to one skilled in the art so that process 400 has the ability to update its repertoire of methods when new methods are discovered and added. An example of the FbHash scheme is set out below:

A similarity score may be calculated whereby D1 is the data object and D2 is a dataset of known malware. Values for D1 and D2 may be obtained as follows:

$$\text{Digest}(D1) = W^{D1}_{ch_0}, W^{D1}_{ch_1}, W^{D1}_{ch_2}, \ldots, W^{D1}_{ch(n-1)}$$

$$\text{Digest}(D2) = W^{D2}_{ch_0}, W^{D2}_{ch_1}, W^{D2}_{ch_2}, \ldots, W^{D2}_{ch(n-1)}$$

where the function Digest( ) is a storage array where $W^{Dx}_{ch(n-1)}$ is a chunk score generated by a FbHashing algorithm represented as $W^D_{ch_0}, W^D_{ch_1}, W^D_{ch_2}, \ldots, W^D_{ch_{n-1}}$,
n: represents numbers of chunk scores used (or the number of blocks of the data object) and a FbHashing algorithm represents one of many methods for digital investigation where the following notations represent:

Chunk: Sequence of k consecutive bytes of a document.
$ch_i^D$: represents the $i^{th}$ chunk of document D.
Chunk Frequency: Number of times a chunk $ch_i$ appears in a document D. Represented as ch $f_{ch_i}^D$.
Document Frequency: The number of documents that contain chunk ch. Represented as $df_{ch}$.
N: denotes the total number of documents in the document corpus.
RollingHash($ch_i$): Rolling hash value of $ch_i$
ch−wght$_{ch_i}$: Chunk weight of $ch_i$
doc-wghtdoc—wght$_{ch_i}$: Document weight $ch_i$.
$W_{ch_i}^D$: denotes the chunk-Score of $ch_i$ in document D.

Once values have been obtained for D1 and D2, a final similarity score, Similarity $(D_1, D_2)$ may be computed using a cosine similarity method as follows:

$$\text{Similarity}(D_1, D_2) = \frac{\sum_{i=0}^{n-1} W_{ch_i}^{D_1} \times W_{ch_i}^{D_2}}{\sqrt{\sum_{i=0}^{n-1} W_{ch_i}^{D_1^2}} \times \sqrt{\sum_{i=0}^{n-1} W_{ch_i}^{D_2^2}}} \times 100$$

Final similarity scores will range between 0 and 100 whereby a score of 100 implies that D1 is identical with D2 while a score of 0 implies that D1 does not match with D2 at all.

At step 450, process 400 then determines whether the data object is to be disassembled or interpreted. If process 400 determines that the data object comprises substantial amounts of ASCII, process 400 will then cause the data object to be interpreted (steps 460, 482, 484, 486) while if process 400 determines that the data object comprises substantial amounts of machine language, process 400 will cause the data object to be disassembled (steps 455, 465, 470, 475).

If process 400 determines that the data object is to be disassembled, it will proceed to step 455. At this step, process 400 performs a listing process on the TSP lookup table of the data object. Based on the listed platform type, process 400 will decompile the file and list all internal and external calls at step 470, list all call functions at step 465, and list all used third library files at step 475. By listing out the common malware behaviours, which typically comprise commands that require access to file system, Ethernet I/O or any network access, process 400 is able to identify portions of the data object that may possibly constitute malware.

Process 400 provides all this information to a table array which comprise predefined settings to identify commands that comprise normal behaviour or commands which may be threats. For example, the number of times a "DNS function" is called is recorded. Based on the data object's file type, process 400 then determines whether it is common for such a file type to call the selected function and if its behaviour is abnormal, the data object will be prevented from executing the function, the data object area will be locked and the user will be alerted. Process 400 then triggers a numeral counter in Counter 1 indicating that the data object has been disassembled while at the same time resetting a numeral counter in Counter 2.

In other words, during the disassembling step, the data object is decompiled so that its behaviour may be analysed in detail. In embodiments of the invention, the raw binary of the data object may be obtained so that malware embedded inside the data object may be discovered and such an exemplary plot of the decompiled data is illustrated in FIG. 6.

Figure 6:
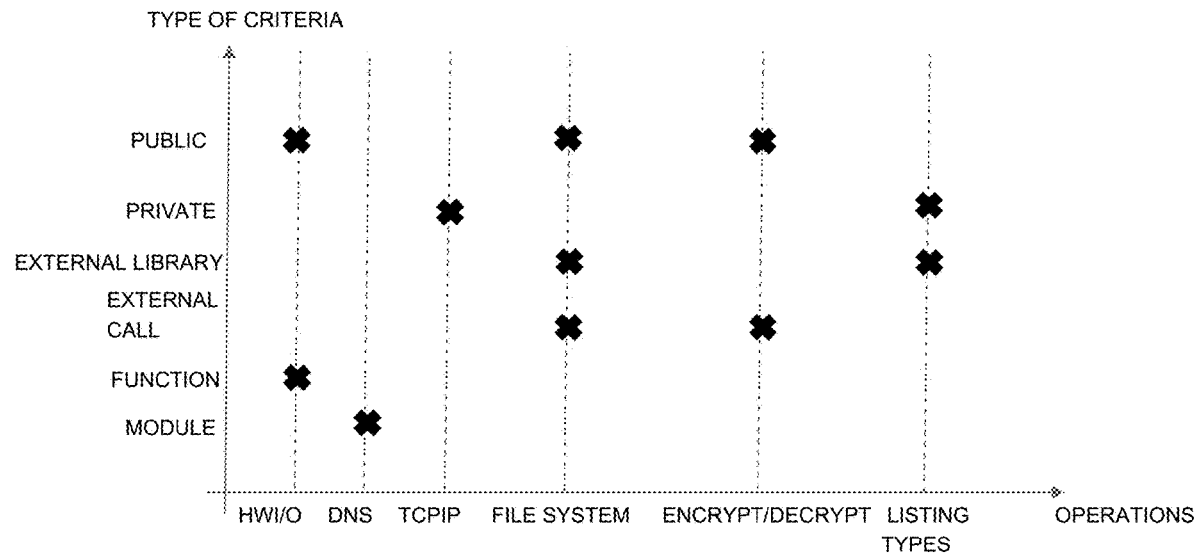
FIG. 6 illustrates a plot having an x axis that represents the frequency of a type of operation while the y axis represents a type of operation after a data object has been disassembled in accordance with embodiments of the claimed subject matter.

FIG. 6 shows that different types of operations may be marked according to operation type. In these exemplary plots, the x axis represents the frequency of a type of operation while they axis represents the type of operation and may be plotted using the exemplary pseudocode below:

Diss_table[0][x1_criterianame][operationtype][0 or 1] to Diss_table[n−1][xn−1_criterianame][operationtypen−1][0 or 1]

Returning to FIG. 4, if process 400 determines that the virtual data model is to be "interpreted", process 400 proceeds to step 460 whereby the virtual data model is descripted at this step and divided into various parts for further analysis. Obfuscated strings/encrypted blocks are provided to step 482, call functions by third parties are provided to step 484 and references to external links are provided to step 486. The outcome is then stored at step 48 whereby a numeral counter in Counter 2 is triggered indicating that the data object has been interpreted while at the same time resetting a numeral counter in Counter 1.

The outcome from steps 480 and 488 are then provided to data model generator at step 490 which may then use this information together with all the information generated by process 400 thus far to compute a dataset model A.

In accordance with embodiments of the invention, process 400 uses the information generated thus far to generate a "result value" for each of the blocks of the data object whereby each result value comprises 3 bytes so that a data image model may be generated.

The most significant bit (MSB) and the second MSB of the first byte of the result value is used to indicate whether the block of the data object was disassembled or interpreted, while the remaining 6 bits of the first byte which are parsed with the second byte (producing 14 bits) are used to represent the obfuscation value of the block of the data object (as computed at step 445). The third byte of the result value is then used to represent the forensic analysis value (as computed at step 447).

In accordance with other embodiments of the invention, for hardware anomalies, the first 12 bits including the MSB ($1^{st}$ byte+part of the $2^{nd}$ byte) will represent the power monitor (current/voltage that will be converted by ADC), the next 10 bits will represent the temperature values, and the last 2 bits will indicate CPU loads: (values between 1-9 represents a low load, 10 represents a medium load and 11 represents a high load).

A block of 512 bytes is then used to indicate the data object's name/location in NAND flash such as its page/sector/PLANE address/status of file if locked or not locked/digital signature.

Process 400 will then generate the data model A based on the appropriate features that were extracted above.

Figure 7A:
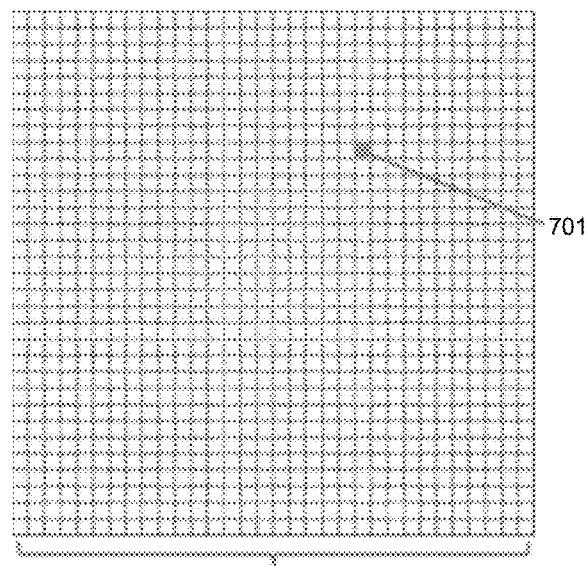
FIG. 7A illustrates a 512×512 pixels plot for generating an image of a data model in accordance with embodiments of the claimed subject matter.

In embodiments of the invention, the data model A may be represented as an image comprising 512×512 pixels, whereby each of pixel 701 represents a result value (which comprises 3 bytes). This is illustrated in FIG. 7A where each line in the image represents a line of pixels and this illustration shows a plain image as it represents an "empty data object".

Figure 7B:
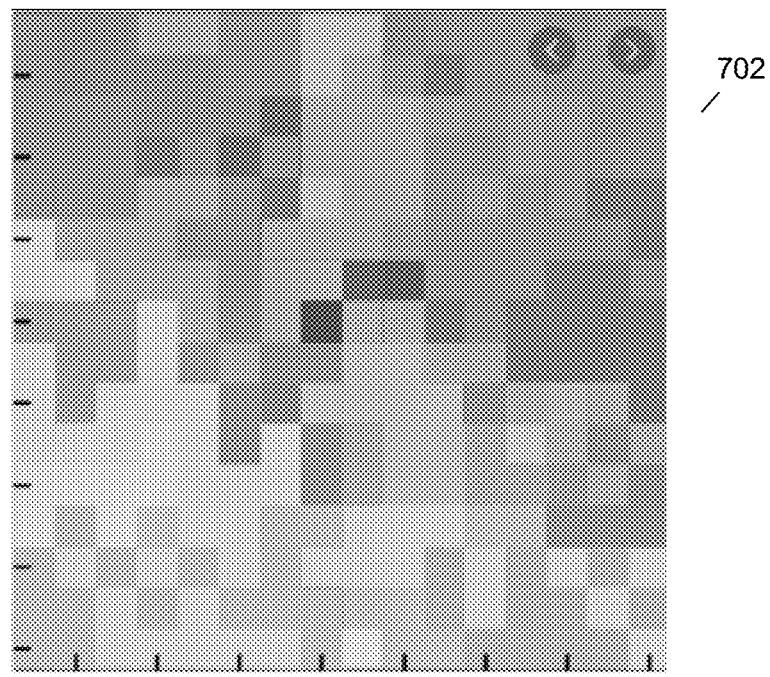
FIG. 7B illustrates a generated image of a data model in accordance with embodiments of the claimed subject matter.

Hence, once process 400 has produced the result values for the blocks of the data object, these result values are then plotted onto the 512×512 canvas to produce a data image model 702 as illustrated in FIG. 7B. In this embodiment of the invention, each unique result value is represented by a unique image representation such as, but not limited to, a corresponding shaded/coloured pixel on image 702.

Figure 7C:
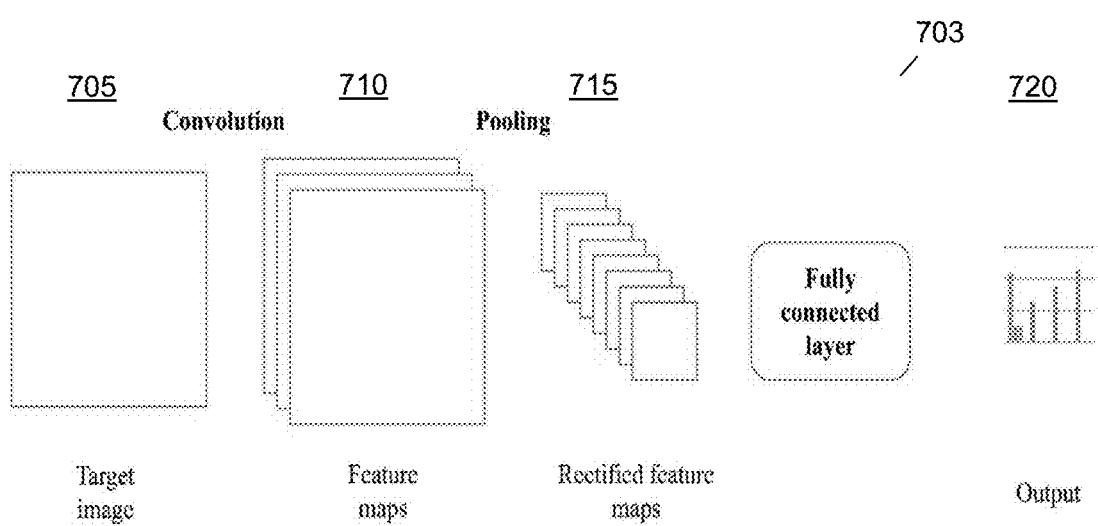
FIG. 7C illustrates a comparison between a generated data image model and images that were previously for pre-trained dataset models in accordance with embodiments of the claimed subject matter.

Once image 702 has been generated, image 702 will then be provided to process 703 as illustrated in FIG. 7C. At step 705, the target image (i.e. image 702) is provided to an image classification model such as, but not limited to, a convolutional neural network (CNN) model, a deep neural network (DNN) model or a recurrent neural network (RNN) model. The detailed workings of these models are omitted for brevity. The image classification model then generates features maps and rectified feature maps for image 702 at steps 710 and 715, and then proceeds to generate an output at step 720. This output is then compared with a database of outputs that represent known malware and if process 703 determines that the output at step 720 matches plot with an output of known malware, it is determined that the data object is malicious.

Figure 8:
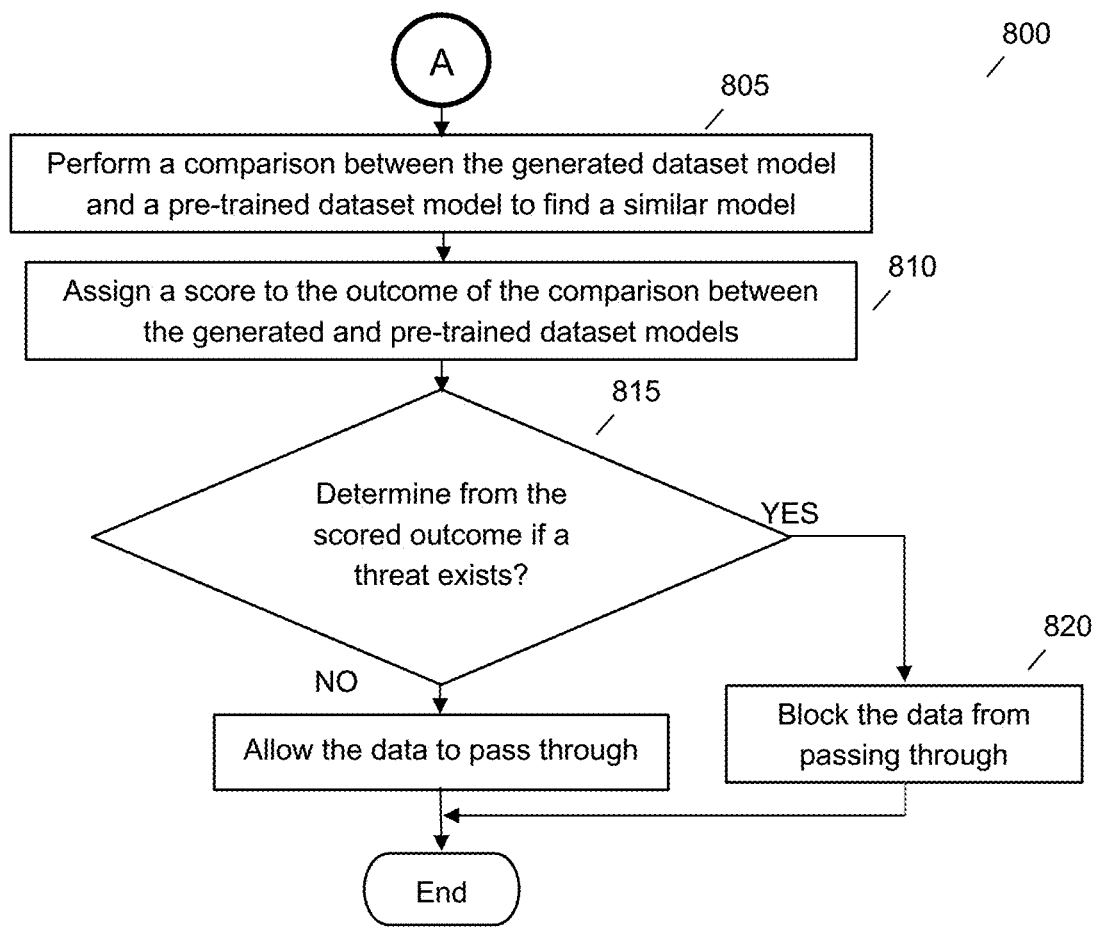
FIG. 8 illustrates a process or method for scoring a dataset model generated by the process illustrated in FIG. 4 based on its features using a machine learning model whereby the scores are used determine the veracity of the data file in accordance with embodiments of the claimed subject matter.

In another embodiment of the invention, dataset model A may comprise a collection of the result values for all the blocks of the data object. With reference to FIG. 8, process 800 then searches through a preloaded database of abnormal data objects to identify a database model that is similar to that of dataset model A. This takes place at step 805.

As it is unlikely that a perfect match may be found, process 800 then performs a machine learning analysis to determine a matching score that is to be assigned to dataset model A based on the pre-trained dataset model that is most similar to it. This takes place at step 810. In embodiments of the invention, the machine learning algorithm adopted for this step may comprise supervised machine learning algorithm that has been trained using a set of pre-trained dataset models. In embodiments of the invention, the pre-trained dataset models may be prepared using external processing devices and stored within a SSD storage device accessible by process 800. To facilitate the ease of access, an indexed file stored within the storage device may be accessible by process 800 whereby this indexed file contains information about the database list that may be called.

Process 800 then determines at step 815 if the generated score exceeds a predetermined threat threshold. If process 800 determines that the generated score implies that the dataset model A is unsafe, process 800 will proceed to step 820 which blocks the data object from being installed onto the system's data storage and creates a log map showing where the data object resides in quarantine and process 800 then ends. Alternatively, if process 800 determines from the generated score that the data object is safe, process 800 allows the data object to pass through at step 820 to be installed in the data storage of the system and process 600 then ends.

In other embodiments of the invention, both processes 703 and 800 may be carried out either sequentially or concurrently in order to put the data object through a more stringent screening process.

Numerous other changes, substitutions, variations, and modifications may be ascertained by the skilled in the art and it is intended that the present invention encompass all such changes, substitutions, variations and modifications as falling within the scope of the appended claims.

What is claimed is:

1. A system for detecting data anomalies in a received data object, the system comprising:
    a processing unit; and
    a non-transitory media readable by the processing unit, the media storing instructions that when executed by the processing unit, causes the processing unit to:

determine a security posture of the data object based on a digital signature and a file type of the data object;

generate a type-security-platform (TSP) lookup table based on the security posture and features of the data object associated with the security posture, and generate an obfuscation value and a forensic value for the received data object based on the TSP lookup table;

generate disassembled values or interpreted values for the data object;

compute a result value for each block of the received data object, whereby the result values for each of the respective blocks of the received data object are generated based on the disassembled or interpreted values, an obfuscation value and a forensic value associated with the respective block of the received data object;

create a data model based on all the result values of the data object; and process the data model using an artificial intelligence (AI) algorithm to determine if the data object contains data anomalies.

2. The system according to claim 1 wherein the instructions to generate an obfuscation value for the received data object comprises instructions for directing the processing unit to:

divide the data object into blocks of data; and calculate a Shannon Entropy value for each block of data.

3. The system according to claim 1 wherein the instructions to generate a forensic value for the received data object comprises instructions for directing the processing unit to:

divide the data object into blocks of data; and calculate a similarity score for each block of data using a Frequency-Based Similarity hashing scheme.

4. The system according claim 2 wherein the instructions to generate a forensic value for the received data object comprises instructions for directing the processing unit to:

divide the data object into blocks of data; and calculate a similarity score for each block of data using a Frequency-Based Similarity hashing scheme.

5. The system according to claim 1 wherein the instructions to generate the result value for each block of the received data object comprises instructions for directing the processing unit to:

generate a result value for each respective block of the received data object comprising three bytes for each block of the received data, whereby for each respective block, the instructions direct the processing unit to:

set a most significant bit (MSB) and a second MSB of a first byte of the result value for each respective block of the received data object based on the disassembled or interpreted value of the data object;

parse a remainder of the bits of the first byte with a second byte of the result value for each respective block of the received data object, and set the parsed result based on the obfuscation value associated with the respective block of the received data object; and set a value of a third byte based on the forensic value associated with the respective block of the received data object.

6. The system according to claim 1 wherein the instructions to create a data model based on all the result values of the data object comprises instructions for directing the processing unit to:

generate a data image model whereby each pixel in the data image model is associated with a unique result value, wherein each unique result value is represented in the data image model by a unique image.

7. The system according to claim 6 wherein the AI algorithm used to process the data model comprises:

a convolutional neural network (CNN) model, a deep neural network (DNN) model or a recurrent neural network (RNN) model.

8. The system according to claim 1 wherein the instructions to process the data model using the artificial intelligence (AI) algorithm comprises instructions for directing the processing unit to:

compare the data model with data models contained within a database, wherein the comparison is performed using machine learning algorithms.

9. The system according to claim 1 wherein the media further comprises instructions for directing the processing unit to:

provide a virtual file system that is configured to receive and store the data object, whereby the virtual file system causes the processing unit to perform steps to receive and store the data object within the virtual file system.

10. The system according to claim 1 wherein the digital signature comprises a magic number associated with the data object.

11. The system according to claim 1 wherein the features of the data object associated with the security posture comprises a platform type and a file type of the data object.

12. A method for detecting data anomalies in a received data object using an Artificial Intelligence (AI) module, the method comprising:

determining, using an analyser module provided within the AI module, a security posture of the data object based on a digital signature and a file type of the data object;

generating, using the analyser module and a detector module provided within the AI module, a type-security-platform (TSP) lookup table based on the security posture and features of the data object associated with the security posture, and generating an obfuscation value and a forensic value for the received data object based on the TSP lookup table;

generating, using a disassembling and interpreting module provided within the AI module, disassembled values or interpreted values for the data object;

computing, using a block structuring module provided within the AI module, a result value for each block of the received data object, whereby the result value for each of the respective blocks of the received data objects is generated based on the disassembled or interpreted values, an obfuscation value and a forensic value associated with the block of the received data object;

creating, using a model generator module provided within the AI module, a data model based on all the result values of the data object; and processing, using an AI threat module provided within the AI module, the data model using an artificial intelligence (AI) algorithm to determine if the data object contains data anomalies.

13. The method according to claim 12 wherein the step of generating the obfuscation value for the received data object comprises the steps of:

dividing the data object into blocks of data; and calculating a Shannon Entropy value for each block of data.

14. The method according to claim 12 wherein the step of generating a forensic value for the received data object comprises the steps of:
   dividing the data object into blocks of data; and
   calculating a similarity score for each block of data using a Frequency-Based Similarity hashing scheme.

15. The method according to claim 13 wherein the step of generating a forensic value for the received data object comprises the steps of:
   dividing the data object into blocks of data; and
   calculating a similarity score for each block of data using a Frequency-Based Similarity hashing scheme.

16. The method according to claim 12 wherein the step of generating the result value for each respective block of the received data object comprises the steps of:
   generating a result value comprising three bytes for each block of the received data, whereby for each respective block, the method:
      sets a most significant bit (MSB) and a second MSB of a first byte of the result value based on the disassembled or interpreted value of the data object;
      parses a remainder of the bits of the first byte with a second byte of the result value, and set the parsed result based on the obfuscation value associated with the block; and
      sets a value of a third byte based on the forensic value associated with the block.

17. The method according to claim 12 wherein the step of creating a data model based on all the result values of the data object comprises the step of:
   generating a data image model whereby each pixel in the data image model is associated with a unique result value, wherein each unique result value is represented in the data image model by a unique image.

18. The method according to claim 17 wherein the AI algorithm used to process the data model comprises:
   a convolutional neural network (CNN) model, a deep neural network (DNN) model or a recurrent neural network (RNN) model.

19. The method according to claim 12 wherein the step of processing the data model using the artificial intelligence (AI) algorithm comprises the step of:
   comparing the data model with data models contained within a database, wherein the comparison is performed using machine learning algorithms.

20. The method according to claim 12 wherein before the step of determining the security posture of the data object based on the digital signature and the file type of the data object; the method further comprises the step of:
   providing, using the analyser module, a virtual file system to receive and store the data object, whereby the virtual file system causes all the steps of the method to be executed within the virtual file system.

21. The method according to claim 12 wherein the digital signature comprises a magic number associated with the data object.

22. The method according to claim 12 wherein the features of the data object associated with the security posture comprises a platform type and a file type of the data object.

* * * * *